United States Patent
Chen et al.

(10) Patent No.: US 10,725,207 B2
(45) Date of Patent: Jul. 28, 2020

(54) OPTICAL APPARATUS HAVING ORGANIC-INORGANIC COMPOSITE MATERIAL

(71) Applicant: Young Optics Inc., Hsinchu (TW)

(72) Inventors: Yi-Hsueh Chen, Hsinchu (TW);
Jia-Bin Huang, Hsinchu (TW);
Chia-Lun Cheng, Hsinchu (TW);
Chia-Mao Chang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 1020 days.

(21) Appl. No.: 14/829,645

(22) Filed: Aug. 19, 2015

(65) Prior Publication Data

US 2017/0052439 A1    Feb. 23, 2017

(51) Int. Cl.
*G02B 1/04* (2006.01)
*G03B 21/16* (2006.01)
*G03B 21/28* (2006.01)

(52) U.S. Cl.
CPC .............. *G02B 1/04* (2013.01); *G03B 21/16* (2013.01); *G03B 21/28* (2013.01)

(58) Field of Classification Search
CPC . G02B 1/04; G02B 7/18; G03B 21/16; G03B 21/60; F24S 23/82
See application file for complete search history.

(56) References Cited

U.S. PATENT DOCUMENTS

| | | | |
|---|---|---|---|
| 6,771,427 B1 | 8/2004 | Matsuo | |
| 8,427,760 B2 | 4/2013 | Hsieh et al. | |
| 8,730,590 B1 | 5/2014 | Tsai et al. | |
| 8,773,774 B2 | 7/2014 | Tsai et al. | |
| 2003/0202161 A1* | 10/2003 | Konno | G02B 17/0663 353/70 |
| 2011/0310303 A1* | 12/2011 | Marcus | G03B 21/567 348/649 |
| 2012/0070675 A1* | 3/2012 | Ogata | G02B 1/111 428/447 |
| 2013/0286359 A1* | 10/2013 | Motoya | F21V 9/08 353/31 |
| 2014/0037930 A1* | 2/2014 | Sun | C03C 17/32 428/220 |
| 2014/0059878 A1* | 3/2014 | Bilaine | B23K 26/0738 34/266 |
| 2014/0078581 A1 | 3/2014 | Tsai et al. | |
| 2014/0085712 A1 | 3/2014 | Tsai et al. | |
| 2015/0023054 A1* | 1/2015 | Goda | B32B 7/12 362/607 |
| 2015/0037535 A1* | 2/2015 | Akimoto | C08F 2/44 428/141 |
| 2015/0301636 A1* | 10/2015 | Akimoto | G06F 3/044 345/173 |
| 2016/0178932 A1* | 6/2016 | Willey | G02B 1/115 351/159.01 |
| 2016/0282529 A1* | 9/2016 | Miyata | G02B 5/208 |

* cited by examiner

*Primary Examiner* — Michelle M Iacoletti
*Assistant Examiner* — Danell L Owens
(74) *Attorney, Agent, or Firm* — JCIPRNET (57) ABSTRACT

An optical apparatus including an image source and an optical component is provided. The image source is configured to provide an image beam. The optical component is disposed on a path of the image beam. A variation of temperature shown by the optical component is less than 25° C., and a distortion of an image formed by the image beam due to the variation of temperature is less than 25 pixels.

20 Claims, 6 Drawing Sheets

OPTICAL APPARATUS HAVING ORGANIC-INORGANIC COMPOSITE MATERIAL

BACKGROUND OF THE INVENTION

Field of the Invention

The invention relates to an optical apparatus.

Description of Related Art

In general optical apparatuses, optical components are used to influence the light. For example, optical components may be used to reflect light, refract light, diffract light, form light interference, diffuse light, filter light, polarize light, transmit light, block light, and so on. Some optical components are made of optical plastics. Generally, optical plastics have low thermal conductivity and high linear coefficient of thermal expansion. As a result, when an optical component made of optical plastics is reduced to comply with the reduction of an optical apparatus, the density of light energy impinging on the optical component is increased so that the optical component absorbs more light energy, the temperature thereof is thus increased more, and the deformation thereof is increased more. When the optical component deforms, the optical quality of the optical component is reduced.

On the other hand, when the density of light energy impinging on different parts of the optical component is different, the temperature distribution of the optical component is not uniform, and the lower the thermal conductivity, the less uniform the temperature distribution of the optical component. As a result, the deformation of the optical component is not uniform or symmetrical, which reduces the optical quality of the optical component greatly.

Besides, when the optical apparatus is used in an environment with a great temperature variation, e.g. from 25° C. to 40° C., the deformation of the optical component at different temperature is different, so that the reliability of the optical apparatus is reduced.

SUMMARY OF THE INVENTION

The invention is directed to an optical apparatus, which has high optical quality and high reliability.

According to an embodiment of the invention, an optical apparatus is provided. The optical apparatus includes an image source and an optical component. The image source is configured to provide an image beam. The optical component is disposed on a path of the image beam. The material of the optical component includes an organic-inorganic composite material, and the organic-inorganic composite material includes an organic substrate and an inorganic additive doped in the organic substrate.

In the optical apparatus of an embodiment of the invention, since the material of the optical component includes an organic-inorganic composite material, wherein the organic-inorganic composite material includes an organic substrate and an inorganic additive doped in the organic substrate, the optical component is more heat resistant, and therefore the optical apparatus can have high optical quality and high reliability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
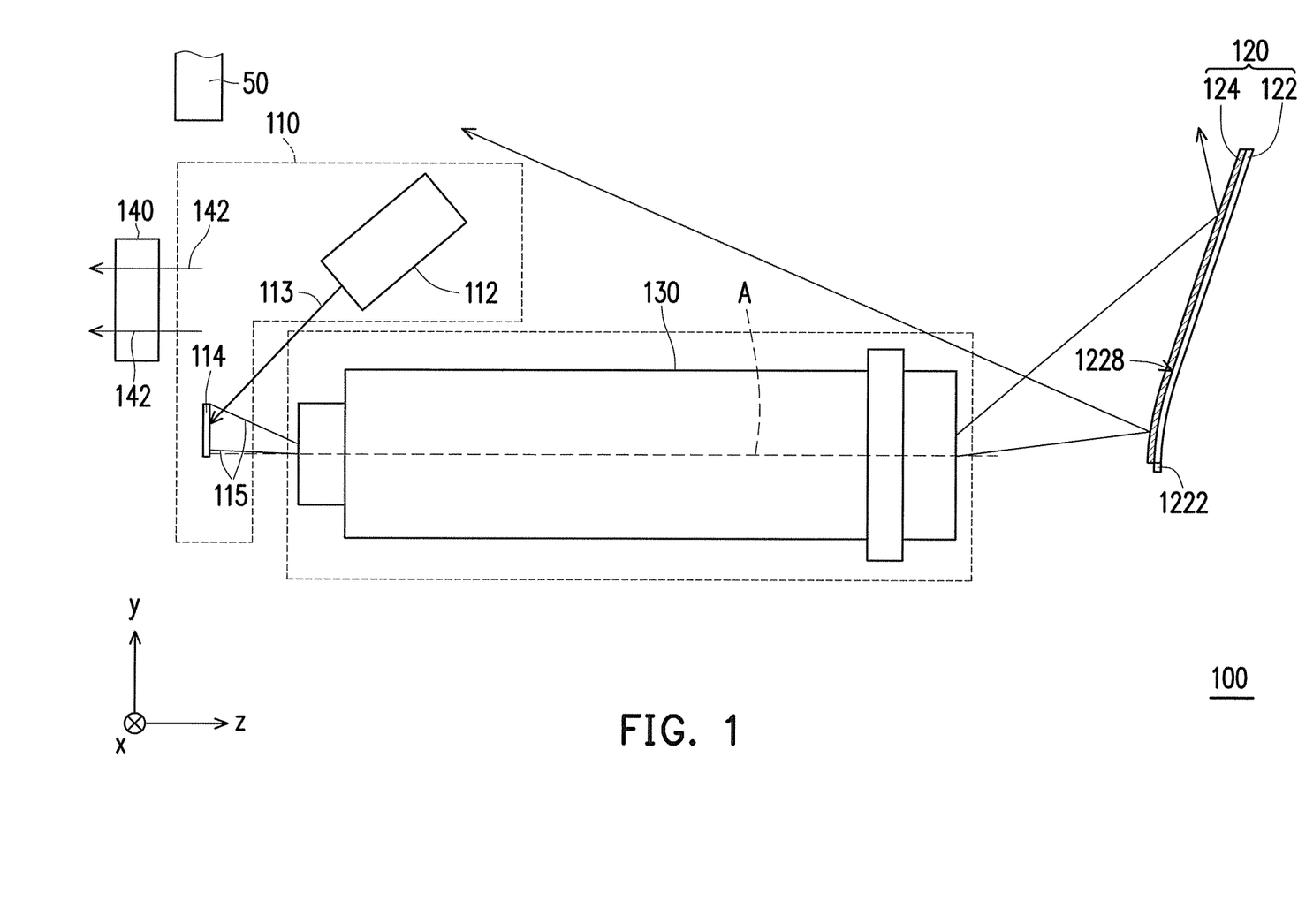
FIG. 1 is a schematic view of an optical apparatus according to an embodiment of the invention.
Figure 2:
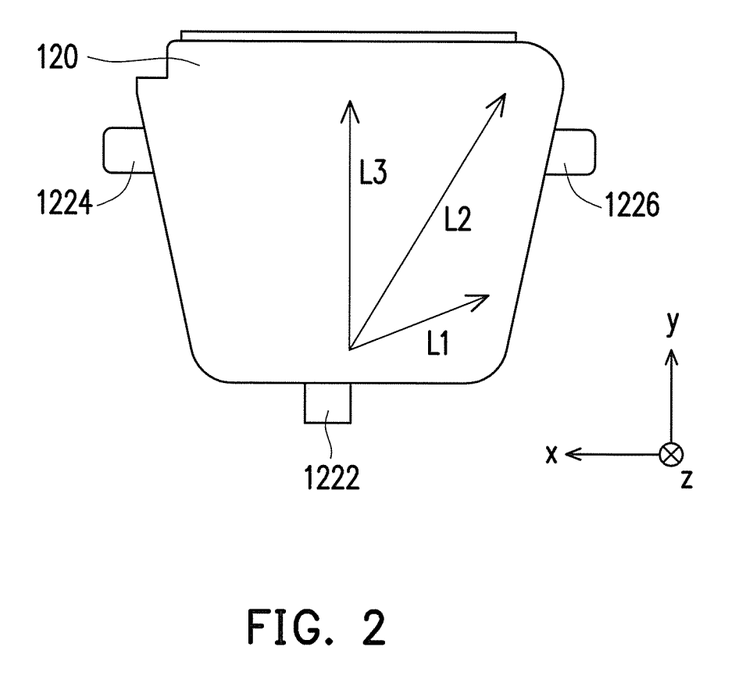
FIG. 2 is a schematic front view of an optical component in FIG. 1.

FIG. 1 is a schematic view of an optical apparatus according to an embodiment of the invention, and FIG. 2 is a schematic front view of an optical component in FIG. 1. Referring to FIGS. 1 and 2, an optical apparatus 100 in this embodiment includes an image source 110 and an optical component 120. The image source 110 is configured to provide an image beam 115. In this embodiment, the image source 110 includes an illumination system 112 and a light valve 114. The illumination system 112 is configured to provide an illumination beam 113. The light valve 114 is disposed on a path of the illumination beam 113 and configured to convert the illumination beam 113 into the image beam 115. The light valve 114 is, for example, a digital micro-mirror device (DMD), a liquid-crystal-on-silicon (LCOS) panel, a transmissive liquid crystal panel, or any other appropriate spatial light modulator.

The optical component 120 is disposed on a path of the image beam 115. In this embodiment, the optical component 120 is a reflector. However, in other embodiments, the optical component 120 may be a lens, an optical film, or any other appropriate optical element. In this embodiment, the optical component 120 includes a substrate 122 and a reflective layer 124, wherein the reflective layer 124 is disposed on the substrate 122 and configured to reflect the image beam 115. In this embodiment, the substrate 122 has a surface 122S on which the reflective layer 124 is formed. The surface 122S may be an axisymmetrical or non-axisymmetrical curved surface; that is, the optical component 120 is an axisymmetrical or non-axisymmetrical curved surface reflector.

In this embodiment, the optical apparatus 100 further includes a projection lens 130 disposed on the path of the image beam 115 between the image source 110 and the optical component 120. The projection lens 130 and the optical component 120 project the image beam 115 from the light valve 114 to a screen 50 to form an image on the screen 50.

In this embodiment, a variation of temperature shown by the optical component 120 (i.e., a variation of temperature at different positions on the optical component 120) is less than 25° C., and a distortion of the image formed by the image beam 115 on the screen 50 due to the variation of temperature is less than 25 pixels. In an embodiment, luminous flux of the image beam 115 impinging on the optical component 120 is greater than 200 lumen (lm), the variation of temperature shown by the optical component 120 is less than 15° C., and the distortion of the image formed by the image beam 115 due to the variation of temperature is less than 15 pixels.

The material of the substrate 122 may comprise plastic. In this embodiment, the linear coefficient of thermal expansion of the substrate 122 is less than 8.5 ppm/° C. As a result, the thermal deformation of the optical component 120 is effectively reduced. Moreover, in this embodiment, the coefficient of thermal conductivity of the substrate is greater than 0.3 W/(m·K), e.g., the coefficient of thermal conductivity of the substrate ranges from 0.7 W/(m·K) to 3.3 W/(m·K), so that the temperature distribution of the optical component 120 is more uniform. In other words, in this embodiment, the material of the substrate 122 is not optical plastic and has a lower linear coefficient of thermal expansion and a higher coefficient of thermal conductivity. For example, the material of the optical component is an organic-inorganic composite material formed by an organic substrate and an inorganic additive. The organic-inorganic composite material can be a material composed of two or more than two materials having different physical and chemical properties. In particular, the organic substrate can be selected from polycarbonate, polymethyl methacrylate (thermoplastic material), an epoxy resin (thermosetting material), polyphenylene sulfide, a cycloolefin polymer, cyclic olefin copolymer, an acrylonitrile-butadiene-styrene copolymer, a liquid crystal polymer, polyether ether ketone, nylon, or a combination thereof, and the inorganic additive can be selected from mineral fiber, glass fiber, carbon fiber, carbon nanotube, graphene, diamond, silicon carbide, aluminum oxide, boron nitride, aluminum nitride, or a combination thereof.

In this embodiment, the surface roughness Ra of the surface 1228 can be less than 20 nm, wherein a surface roughness less than 10 nm results in better projection quality; since a general organic-inorganic composite material readily has the issue of floating fiber during an injection molding process, phase separation is readily generated to the organic substrate and the inorganic additive thereof during the filling process due to different viscosities of the organic substrate and the inorganic additive, such that the surface roughness cannot reach the demand of a mirror. As a result, except for a general injection process, a specific temperature control technique is used in the injection process, and a variable mold temperature system is used to inhibit floating fiber to achieve the effect of surface mirror, such as the surface roughness Ra<15 nm.

In the optical apparatus 100 according to this embodiment, since the variation of temperature shown by the optical component is less than 25° C., and since the distortion of the image formed by the image beam due to the variation of temperature is less than 25 pixels, the thermal deformation of the optical component 120 is smaller and more uniform. Consequently, the distortion of the image on the screen 50 is less, and the optical apparatus 100 thus has high optical quality and high reliability. Even if the optical component 120 has a small size, the temperature distribution of the optical component is still uniform enough, the thermal deformation of the optical component 120 is still small enough, and the optical apparatus 100 still has high optical quality and high reliability. In an embodiment, the area of the reflective surface of the optical component 120 is less than or equal to 30000 mm$^2$. In this embodiment, the optical axis A is also the optical axis of the projection lens 130, and the z-direction is parallel to the optical axis A. Moreover, the x-direction and the y-direction are perpendicular to the z-direction and perpendicular to each other, the x-direction is, for example, the horizontal direction of the image and the optical component 120, and the y-direction is, for example, the vertical direction of the image and the optical component 120.

In this embodiment, the thickness of the substrate 122 along the direction parallel to the optical axis A of the image source 110 ranges from 2 mm to 20 mm, so that the thermal deformation of the optical component 120 is smaller and uniform. Moreover, the thermal deformation of the surface 1228 along the direction parallel to the optical axis A (i.e. the z-direction) can be less than 200 μm.

In this embodiment, the optical apparatus 100 includes a cooling system 140 configured to cool down the temperature of the optical apparatus 100. For example, the cooling system 140 includes an exhaust fan configured to exhaust the hot air 142 inside the optical apparatus 100. In an embodiment, the cooling system 140 can cool down the temperature of the optical component 120. In some other embodiments, the cooling system 140 may further include a heat sink connected to the optical component 120 and a cooling fan to cool down the heat sink or a metal housing.

Moreover, in this embodiment, the optical apparatus 100 further includes fixing parts 1222, 1224, 1226 to fix the substrate 122 on a housing of the optical apparatus 100. The fixing part 1222 is located at the bottom of the optical component 120, and the fixing parts 1224 and 1226 are located at two sides of the optical component 120. The area of the optical component 120 near the fixing part 1222 reflects the near field rays of the image beam 115, and the area of the optical component 120 far away from the fixing part 1222 reflects the far field rays of the image beam 115.

The following Table 1 shows the coefficients and conditions of optical plastics and the materials of the substrate 122 of the optical component 120.

TABLE 1

|  | Unit | Optical plastic | Optical plastic | Material 1 | Material 2 | Material 3 | Material 4 | Material 5 |
| --- | --- | --- | --- | --- | --- | --- | --- | --- |
| Company |  | Zeon | Zeon | MEP | MEP | Teijin | DIC |  |
| Product No. |  | 1430R | F52R | TJ13591 | GPN2020DF | D5025B | FZ-8600 |  |
| System |  | Cyclic olefin polymer (COP) | Cyclic olefin polymer (COP) | Polycarbonate (PC) | Polycarbonate (PC) | Polycarbonate (PC) | Polyphenylene sulfide (PPS) | Epoxy resin (EPOXY) |
| Coefficient of thermal | W/m · k | <0.3 | <0.3 | 3.3 | <0.3 | <0.3 | <0.3 | <0.3 |

TABLE 1-continued

| | Unit | Optical plastic | Optical plastic | Material 1 | Material 2 | Material 3 | Material 4 | Material 5 |
|---|---|---|---|---|---|---|---|---|
| conductivity (mold flow direction) | | | | | | | | |
| Coefficient of thermal conductivity (thickness direction) | W/m · k | <0.3 | <0.3 | 0.7 | <0.3 | <0.3 | <0.3 | <0.3 |
| Coefficient of thermal expansion (mold flow direction) | ppm/° C. | 70 | 61 | 8.5[a] | 34 | 40 | 18[b] | 31.8[c] |
| Coefficient of thermal expansion (thickness direction) | ppm/° C. | 70 | 61 | 8.5[a] | 40 | 40 | 18[b] | 31.8[c] |

Note:
a, b, and c are average data in the mold flow direction and the thickness direction;
Referring to the a, b, and c portions of the coefficients of thermal expansion in the table, the purpose here is to explain that the coefficient of thermal expansion data in both directions are the same, which yields the average value of the data in both directions Referring to Table 1, the material of the substrate 122 may be Material 1 (i.e. MEP TJ13591), Material 2 (MEP GPN2020DF), Material 3 (Teijin D-5025B), Material 4 (DIC FZ-8600), or Material 5, which has less coefficient of thermal expansion with respect to the two optical plastics (i.e. Zeon 1430R or Zeon F52R). Moreover, Material 1 has higher coefficient of thermal conductivity with respect to the two optical plastics.

Table 2 shows the maximum temperature and the minimum temperature shown by the substrate adopting the optical plastic Zeon 1430R and the substrate 122 adopting MEP TJ13591.

TABLE 2

| | Temperature on the substrate 122 (° C.) | |
|---|---|---|
| Material | Min | Max |
| 1430R | 23.4 | 37.9 |
| TJ13591 | 25.9 | 29.5 |

Referring to Table 2, the substrate 122 adopting MEP TJ13591 has less temperature difference (about 3.6° C.) with respect to the temperature difference (about 14.5° C.) of the substrate adopting the optical plastic Zeon 1430R.

Figure 3:
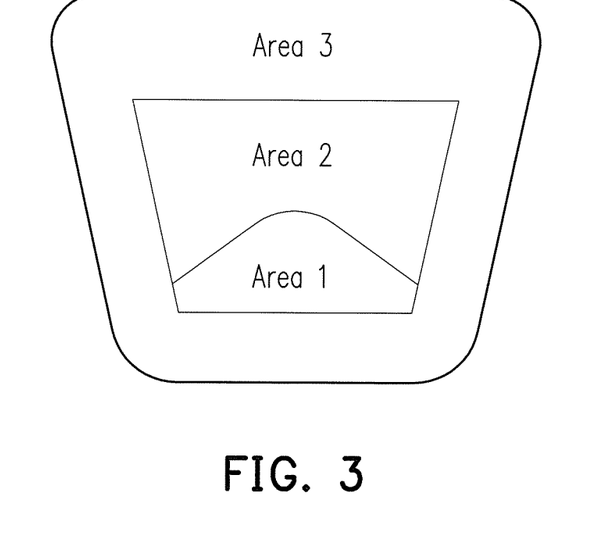
FIG. 3 is a light spot simulation diagram formed by impinging the optical component in FIG. 1 and FIG. 2 with an image beam.

FIG. 3 is a light spot simulation diagram formed by impinging the optical component in FIG. 1 and FIG. 2 with an image beam. In FIG. 3, the order of area 1 to area 2 to area 3 represents the optical energy in a decreasing order.

Figure 4:
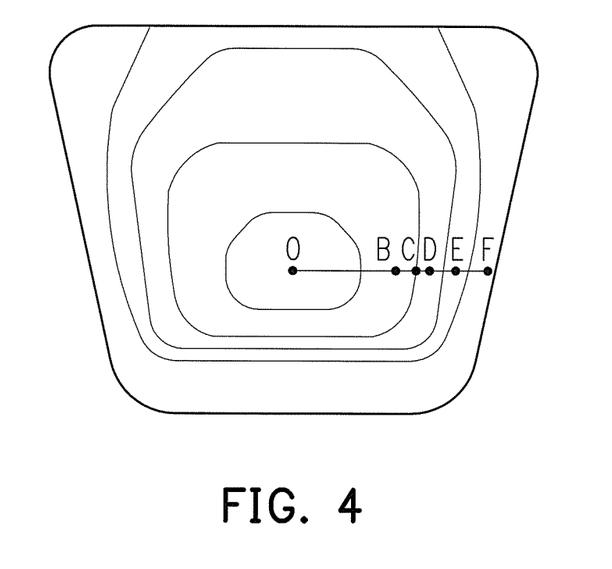
FIG. 4 is a temperature distribution diagram formed by impinging the optical component in FIG. 1 and FIG. 2 with an image beam.

FIG. 4 is a temperature distribution diagram formed by impinging the optical component in FIG. 1 and FIG. 2 with an image beam. In FIG. 4, the order of O to B to C to D to E to F represents the temperature from high to low, wherein the temperature at O is about 35° C., the temperature at B is about 33.5° C., the temperature at C is about 32° C., the temperature at D is about 30° C., the temperature at E is about 28° C., and the temperature at F is about 24° C.

The temperature results of Table 2 can be obtained via FIG. 3, FIG. 4, the material characteristics, and the heat flow analysis software generally used by the industry.

Table 3 shows the maximum deformation and the minimum deformation among all positions of the substrate adopting the optical plastic Zeon 1430R and the substrate 122 adopting MEP TJ13591 in the z-direction.

TABLE 3

| | Deformation (μm) | |
|---|---|---|
| Material | Min | Max |
| 1430R | 41.3 | −21.7 |
| TJ13591 | 4 | −0.5 |

Referring Table 3, the deformation of MEP TJ13591 is smaller and more uniform.

The results of Table 3 can be obtained via Table 2, the material characteristics, and the structural analysis software generally used by the industry.

Figure 5:
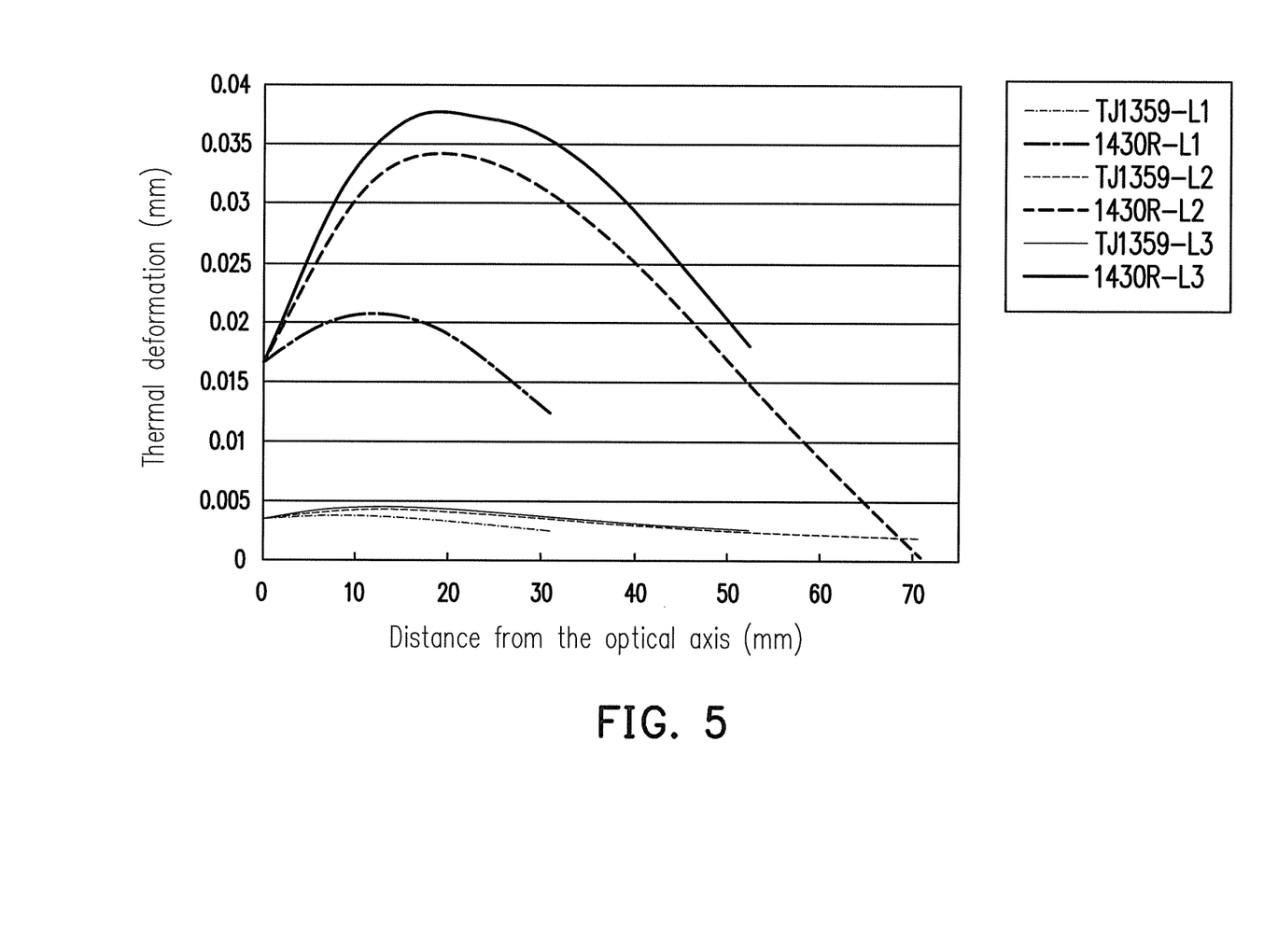
FIG. 5 shows curves of the thermal deformation of the substrate adopting various materials with respect to positions along the directions L1, L2, and L3 shown in FIG. 2.

FIG. 5 shows curves of the thermal deformation of the substrate adopting various materials with respect to positions along the directions L1, L2, and L3 shown in FIG. 2. Referring to FIGS. 2 and 5, for example, the curve TJ1359-L2 shows the thermal deformation distribution of the substrate 122 adopting MEP TJ13591 at the positions along the direction L2 in FIG. 2. FIG. 5 shows that the substrate 122 adopting MEP TJ13591 has less deformation in all the directions L1-L3 with respect to the substrate adopting Zeon 1430R. Moreover, the thermal deformation of the substrate 122 adopting MEP TJ13591 is more uniform since the curves thereof have a smaller absolute value of slope.

Figure 6:
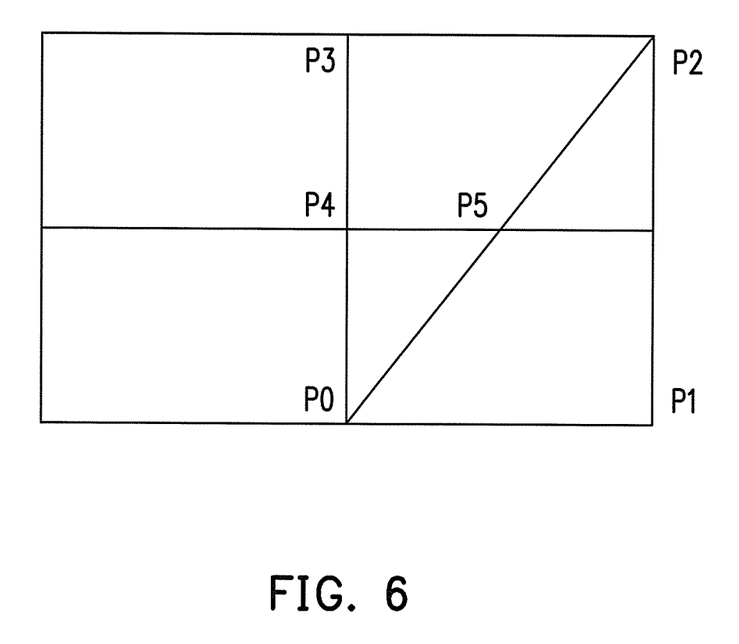
FIG. 6 shows the positions P0-P5 in the image on the screen in FIG. 1.

FIG. 6 shows the positions P0-P5 in the image on the screen in FIG. 1, and the following Table 4 shows the image shifts on the screen in FIG. 1 when the substrate in FIG. 1 adopts Zeon 1430R, MEP TJ13591, and Teijin D-5025B.

TABLE 4

| Material | 1430R | | TJ13591 | | D-5025B | |
|---|---|---|---|---|---|---|
| Image | Image shift on screen (pixels) | | | | | |
| position | x | y | x | y | x | y |
| P0 | 0.00 | −2.05 | 0.00 | −0.55 | 0 | −0.89 |
| P1 | 0.73 | 0.17 | −2.12 | −0.53 | −1.98 | −0.48 |
| P2 | −0.32 | −0.46 | −1.92 | −2.84 | −0.75 | −1.1 |
| P3 | 0.00 | 5.23 | 0.00 | −2.38 | 0 | −0.82 |

TABLE 4-continued

| Material | 1430R | | TJ13591 | | D-5025B | |
|---|---|---|---|---|---|---|
| Image | Image shift on screen (pixels) | | | | | |
| position | x | y | x | y | x | y |
| P4 | 0.00 | −13.84 | 0.00 | −1.86 | 0 | −1.58 |
| P5 | 1.12 | 1.68 | −1.16 | −1.54 | −1.03 | −1.51 |

Referring to FIGS. 1 and 6 and Table 4, for example, Table 4 shows that when the substrate 122 adopts MEP TJ13591, the position P2 has a shift (or image distortion) of −2.84 pixels along the y-direction. In FIG. 6, the positions P0 and P3 are midpoints of the bottom long side and the top long side of the image, respectively, and the position P4 is the midpoint of the positions P0 and P3. Table 4 shows that the absolute value of the maximum shift corresponding to the optical plastic Zeon 1430R (i.e. 13.84 pixels) is greater than that corresponding to MEP TJ13591 (2.84 pixels) and greater than that corresponding to Teijin D-5025B (1.98 pixels). That is to say, in the embodiments of the invention, the optical apparatus 100 adopting MEP TJ13591 (2.84 pixels) or Teijin D-5025B (1.98 pixels) as the material of the substrate 122 has better image quality.

Figure 7:
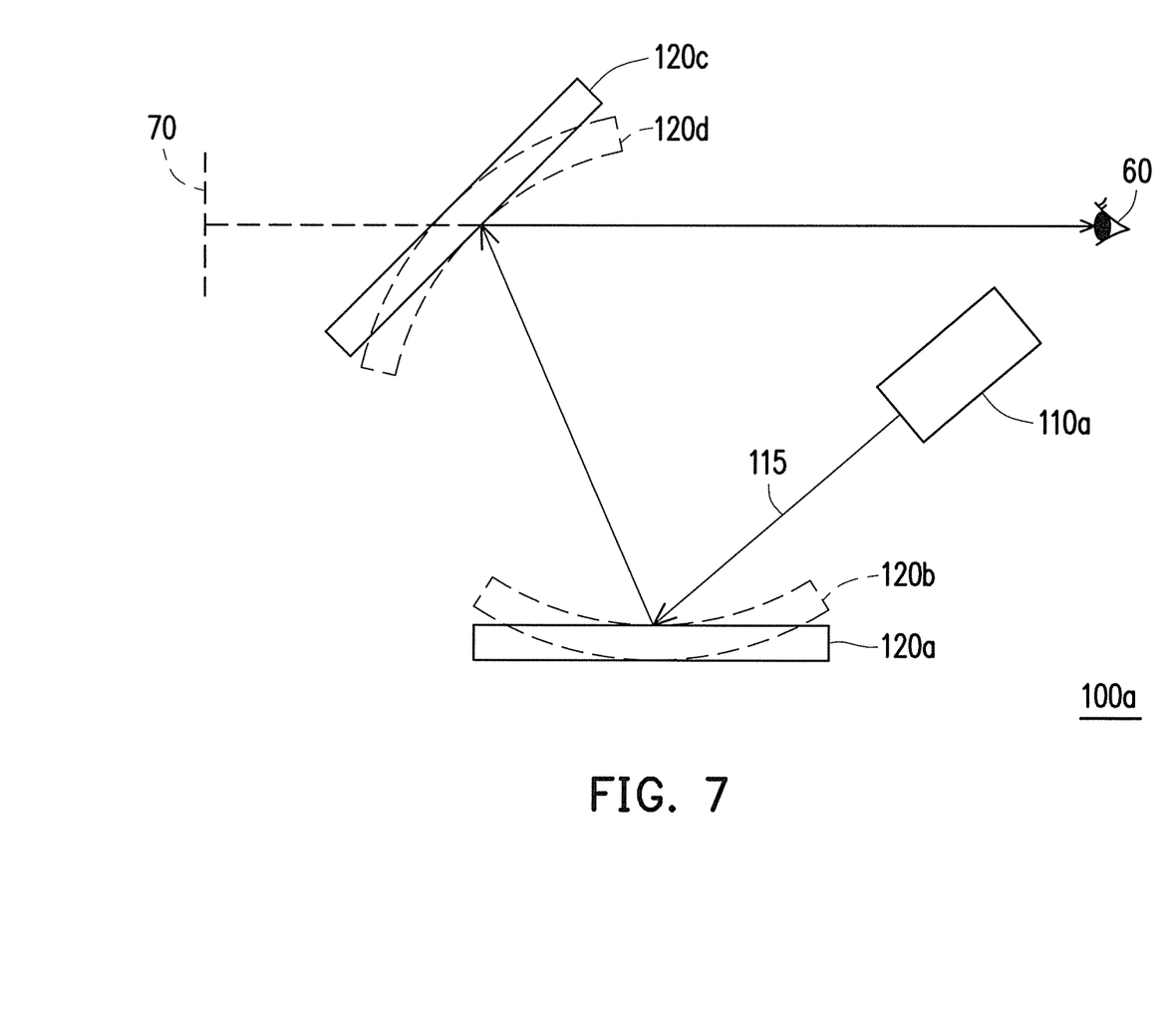
FIG. 7 is a schematic view of an optical apparatus according to another embodiment of the invention.

FIG. 7 is a schematic view of an optical apparatus according to another embodiment of the invention. Referring to FIG. 7, an optical apparatus 100a in this embodiment is similar to the optical apparatus 100 in FIG. 1, and the main difference between the two is as follows. The optical apparatus 100 in FIG. 1 is a projector, including a projector having an ultra-short focal length and a throw ratio (TR) <0.4, a projector having a short focal length and a TR between 0.4 and 1, or a general projector having TR>1. However, the optical apparatus 100a in this embodiment is a virtual image display, for example, a head-up display (HUD) or a head-mounted display (HMD). In this embodiment, an image beam 115 from an image source 110a is reflected by an optical component 120a (or 120b) and an optical component 120c (or 120d) in sequence, and is then transmitted to an eye 60 of a user. The optical components 120a, 120b, 120c, and 120d satisfy the aforementioned heatproof design of the optical apparatus 100 (i.e., satisfies at least one of the heatproof designs of each parameter condition above and the cooling system 140). For example, the optical components 120a, 120b, 120c, and 120d satisfy at least a part of the aforementioned conditions of the optical apparatus 100. The optical components 120a, 120b, 120c, and 120d may be mirrors, transflectors, diffusive reflectors, or any combination thereof, wherein a transflector allows a part of light to pass through and reflects the other part of the light. For example, the optical component 120a may be a diffusive reflector, and the optical component 120c (or 120d) may be a transflector, and a virtual image 70 is formed on an opposite side of the optical component 120c (or 120d) with respect to the eye 60 of the user. The optical components 120a and 120c may be plane reflectors, and the optical components 120b and 120d may be concave reflectors.

In other embodiments, the optical components 120a, 120b, 120c, and 120d may also be transmissive optical components, such as optical lens adapted to let light pass through, and the material thereof may be an organic-inorganic composite material adopted by the above optical components, and is not repeated herein.

The optical apparatus 100a may adopt the optical components 120a and 120c, or adopt the optical components 120b and 120d, or adopt the optical components 120a and 120d, or adopt the optical components 120b and 120c, but the invention is not limited thereto. In some other embodiments, at least a part of the optical components 120a-120d may be a convex reflector. Alternatively, in some other embodiments, the image beam 115 from the optical component 120c (or 120d) may be projected onto a screen so as to form a real image on the screen; that is, the optical apparatus 100a may be modified to be a projector having a plurality of optical components similar to the optical components 120a-120d.

TABLE 5

| | | Material | | | | |
|---|---|---|---|---|---|---|
| | | TJ13591 | GPN2020DF | D5025B | D5025B | FZ-8600 |
| | | | | | Mold temperature | |
| | | Single temperature | Single temperature | Single temperature | Variable mold temperature | Single temperature |
| Surface roughness | nm | 46 | 19 | 15 | <10 | 14 |
| Grid line deviation on screen (flare) | Pixels | <20 | <10 | <10 | <5 | <10 |

Table 5 shows that when MEP TJ13591 is adopted for the substrate, the surface roughness is relatively greater than D5025B or 4FZ-8600 due to the additive. In comparison to a screen projecting a grid line, it can be seen that the surface roughness can be improved by using D5025B and FZ-8600 as the substrate, and therefore pixel deviation on the screen can be reduced (in Table 5, the grid line deviation pixel data is not actual measurement value, and is obtained by observing screen projection results and speculating according to past experience). Moreover, since the viscosity characteristics of the additive and the plastic are different, the substrate surface roughness is affected by the additive after injection molding, such that the projection quality is affected. This issue can be adjusted by rapidly changing the mold temperature during the injection process via a variable mold temperature technique, such that the substrate has better surface quality. The variable mold temperature technique is a known and mature technique, and the main function thereof is to make the additive not readily come to the surface during the injection process, and therefore the variable mold temperature technique capable of improving surface roughness is a known and mature technique, and the main function thereof is to make the additive not readily come to the surface during the injection process, and therefore surface roughness can be improved. In FIG. 5, D5025B adopts a variable mold temperature technique, and the surface roughness can be effectively reduced according to experience and speculation, such that the surface roughness Ra<10 nm. The surface roughness affects optical projection brightness and the reflective layer affects optical projection brightness, which is related to the reflectance of the reflective layer 124, and to maintain optical projection quality of the reflective layer, the reflectance of the reflective layer 124 needs to at least reach 90%, wherein a reflectance of 96% or more is preferred.

In the optical apparatus according to an embodiment of the invention, since the variation of temperature shown by the optical component is less than 25° C., and the distortion of the image formed by the image beam due to the variation of temperature is less than 25 pixels, the optical apparatus has high optical quality and high reliability. In the optical apparatus of an embodiment of the invention, since the material of the optical component includes an organic-inorganic composite material, wherein the organic-inorganic composite material includes an organic substrate and an inorganic additive doped in the organic substrate, the optical component is more heat resistant, and therefore the optical apparatus can have high optical quality and high reliability.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical apparatus comprising: an image source configured to provide an image beam; an optical component disposed on a path of the image beam, wherein a material of the optical component comprises an organic-inorganic composite material, and the organic-inorganic composite material comprises an organic substrate and an inorganic additive doped in the organic substrate; and a reflective layer disposed on the substrate and configured to reflect the image beam.

2. The optical apparatus of claim 1, wherein the organic substrate is selected from a following group consisting of polycarbonate, polymethyl methacrylate, and epoxy resin, polyphenylene sulfide, a cycloolefin polymer, a cyclic olefin copolymer, an acrylonitrile-butadiene-styrene copolymer, a liquid crystal polymer, polyether ether ketone, nylon, or a combination thereof, and the inorganic additive is selected from a following group consisting of mineral fiber, glass fiber, carbon fiber, carbon nanotube, graphene, diamond, silicon carbide, aluminum oxide, boron nitride, aluminum nitride, or a combination thereof.

3. The optical apparatus of claim 1, wherein the substrate has a surface on which the reflective layer is formed, and a surface roughness Ra of the surface is less than 20 nm.

4. The optical apparatus of claim 1, wherein a reflectance of the reflective layer is greater than or equal to 90%.

5. The optical apparatus of claim 3, wherein a linear coefficient of thermal expansion of the substrate is less than 60 ppm/° C., or a coefficient of thermal conductivity of the substrate is greater than 0.3 W/(m·K).

6. The optical apparatus of claim 1, wherein a thickness of the substrate along a direction parallel to an optical axis of the image source ranges from 2 mm to 20 mm.

7. The optical apparatus of claim 1, wherein the substrate has an axisymmetrical or non-axisymmetrical curved surface, and the reflective layer is formed on the axisymmetrical or non-axisymmetrical curved surface.

8. The optical apparatus according to claim 1, wherein the substrate has a surface on which the reflective layer is formed, and a thermal deformation of the surface along a direction parallel to an optical axis of the image source is less than 200 μm.

9. The optical apparatus according to claim 1, wherein an area of a reflective surface of the optical component is less than or equal to 30000 mm².

10. An optical apparatus comprising: a light valve configured to provide an image beam; an optical component disposed on a path of the image beam, wherein a material of the optical component comprises an organic-inorganic composite material, and the organic-inorganic composite material comprises an organic substrate and an inorganic additive doped in the organic substrate; and a reflective layer disposed on the substrate and configured to reflect the image beam.

11. The optical apparatus of claim 10, wherein the organic substrate is selected from a following group consisting of polycarbonate, polyrnethyl methacrylate, an epoxy resin, polyphenylene sulfide, a cycloolefin polymer, a cyclic olefin copolymer, an acrylonitrile-butadiene-styrene copolymer, a liquid crystal polymer, polyether ether ketone, nylon, or a combination thereof, and the inorganic additive is selected from a following group consisting of mineral fiber, glass fiber, carbon fiber, carbon nanotube, graphene, diamond, silicon carbide, aluminum oxide, boron nitride, aluminum nitride, or a combination thereof.

12. The optical apparatus of claim 10, wherein the substrate has a surface on which the reflective layer is formed, and a surface roughness Ra of the surface is less than 20 nm.

13. The optical apparatus of claim 10, wherein a reflectance of the reflective layer is greater than or equal to 90%.

14. The optical apparatus of claim 10, wherein a linear coefficient of thermal expansion of the substrate is less than 60 ppm/° C., or a coefficient of thermal conductivity of the substrate is greater than 0.3 W/(m·K).

15. The optical apparatus of claim 10, wherein a thickness of the substrate along a direction parallel to an optical axis of the image source ranges from 2 mm to 20 mm.

16. The optical apparatus of claim 10, wherein the substrate has an axisymmetrical or non-axisymmetrical curved surface, and the reflective layer is formed on the axisymmetrical or non-axisymmetrical curved surface.

17. The optical apparatus according to claim 10, wherein the substrate has a surface on which the reflective layer is formed, and a thermal deformation of the surface along a direction parallel to an optical axis of the image source is less than 200 μm.

18. The optical apparatus according to claim 10, wherein an area of a reflective surface of the optical component is less than or equal to 30000 mm².

19. An optical apparatus comprising:
an image source configured to provide an image beam; and
an optical component disposed on a path of the image beam, wherein a material of the optical component comprises an organic-inorganic composite material, and the organic-inorganic composite material comprises an organic substrate and an inorganic additive doped in the organic substrate,
wherein an area of a reflective surface of the optical component is less than or equal to 30000 mm².

20. The optical apparatus according to claim 19, wherein the image source is a light valve.

* * * * *